Z. Doolittle.
Upsetting Tires.
N°. 20,780. Patented Jul. 6, 1858.
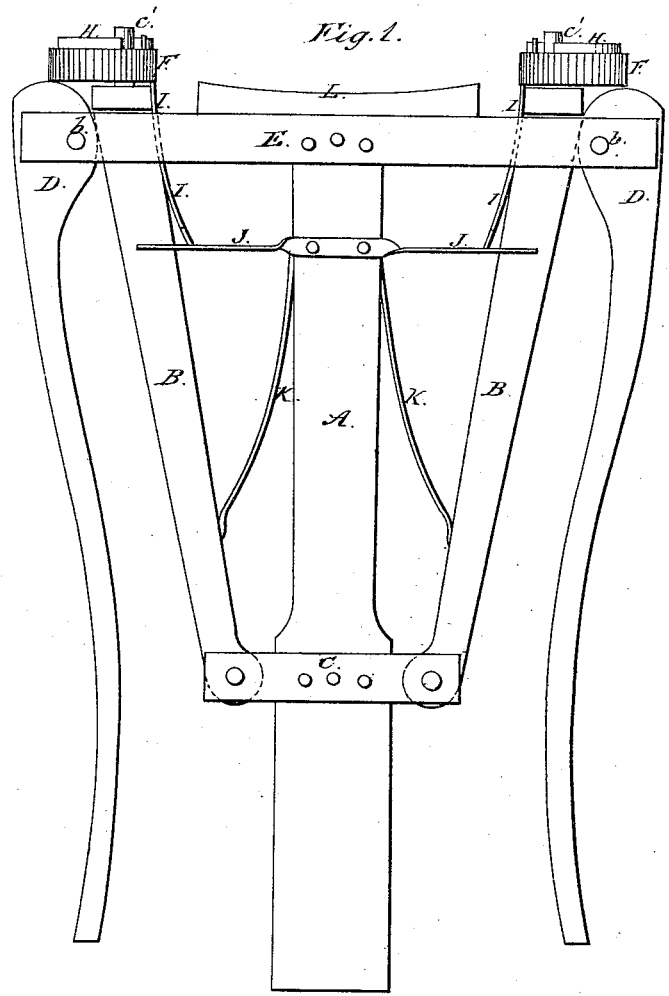
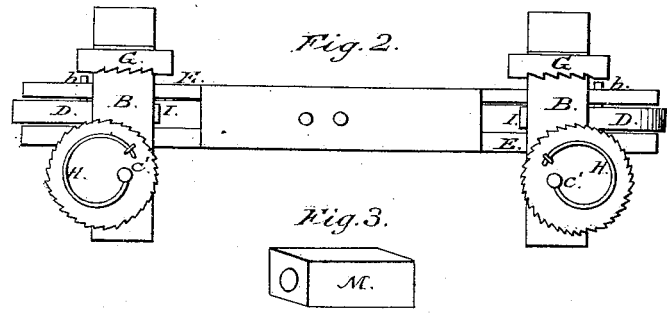

UNITED STATES PATENT OFFICE.

ZINA DOOLITTLE, OF PERRY, GEORGIA.

MACHINE FOR UPSETTING CARRIAGE-AXLES.

Specification of Letters Patent No. 20,780, dated July 6, 1858.

*To all whom it may concern:*

Be it known that I, ZINA DOOLITTLE, of Perry, in the county of Houston and State of Georgia, have invented a new and useful Improvement in Machines for Upsetting Carriage Axles and Tires; and I do hereby declare that the following is a full, clear, and exact description of the same, reference being had to the accompanying drawings, forming a part of this specification, in which—

Figure 1, is a front view. Fig. 2, is a top view, and Fig. 3, a view of a block which is used in upsetting an axle.

Similar letters of reference in each of the several figures indicate corresponding parts.

To enable others, skilled in the art, to make and use my invention, I will proceed to describe its construction and operation.

A, represents a center post or bar; by which the machine is secured to the bench in any convenient manner.

B, B, represent two moving jaws secured to A, by the cross piece C, C.

D, D, are two eccentric hand levers, secured to the cross pieces E, E, by the bolts *b*, *b*, said cross pieces serving as guides for the jaws B, B.

F, F, are two ratchet toothed eccentric clutches resting upon the heads of the jaws B, B, and turning upon the steel pins *c′*, *c′*.

G, G, represent two steel serrated dies resting against a projection on the head of jaws opposite the clutchs F, F.

H, H, are springs which cause the clutches F, F, to press against the dies G, G.

I, I, are two slides, which when raised by the springs J, J, hold the clutches at a distance from the dies G, G, ready to receive the axle or tire.

K, K, are springs for extending the jaws B, B.

L, is a rest for the tire.

The machine described above is constructed wholly of iron and steel.

To operate this machine, extend the clutches F, F, then place the tire upon the slides I, I, with the hot part on the rest L. The weight of the tire or axle depresses the slides I, I, and releases the clutches F, F, which strike against the axle or tire pressing it against the dies G, G; then apply one of the hand levers D, which causes the clutches F, F, to take a firm hold on the iron and compresses it in part; then apply the other hand lever D, keeping the first lever raised in the meantime, and when the iron is sufficiently compressed, drop the hand levers D, D, and as the springs K, K, extend the jaws B, B, the clutches let go their hold and the operation is completed.

This machine may be used with one or two levers as desired.

Fig. 3, letter M, represents a short piece or block of square iron used in upsetting axles that have been worn smaller than the box, to the size of box at the small end of journal. In one end of said block is a hole of sufficient size and depth to receive that portion of the axle upon which the nut washer is secured to the shoulder of screw, by which the compressing power of the machine can be applied directly to the shoulder of screw on the end of journal without injuring or disfiguring the thread, thus saving much time and labor in recutting the thread. To operate this block in connection with the machine, first place the block M, upon one of the moving jaws B, between the clutch F, and die G, with the hole toward the rest L, then insert the axle when hot in the hole in the block M, then depress the slide I, and the other clutch F, takes hold of the axle, then by raising the hand levers D, D, the axle can be enlarged to the size of the box, the thread remaining in its original form.

What I claim as my invention and desire to secure by Letters Patent, is—

1. The arrangement of the center bar or anvil A, L, pivoted jaws B, B, and eccentric levers D, D, in the relation to one another shown, for the purposes set forth.

2. The combination with the above, of eccentric clutches F, F, dies G, G, springs H, H, and slides I, I, substantially as and for the purposes set forth.

ZINA DOOLITTLE.

Witnesses:
Jos. S. JOBSON,
E. M. HULSEY.